J. WILMOTTE.
MILKING MACHINE.
APPLICATION FILED DEC. 9, 1913.

1,408,326.

Patented Feb. 28, 1922.

Inventor
J. Wilmotte
By
Atty.

UNITED STATES PATENT OFFICE.

JOSEPH WILMOTTE, OF CINEY, BELGIUM.

MILKING MACHINE.

1,408,326. Specification of Letters Patent. Patented Feb. 28, 1922.

Application filed December 9, 1913. Serial No. 805,559.

(GRANTED UNDER THE PROVISIONS OF THE ACT OF MARCH 3, 1921, 41 STAT. L., 1313.)

*To all whom it may concern:*

Be it known that I, JOSEPH WILMOTTE, technical manager, a subject of the King of the Belgians, and resident of Château de St. Quentin, Ciney, Belgium, have invented certain new and useful Improvements in Milking Machines, of which the following is a specification.

This invention relates to milking machines of the kind in which the pulsator is suspended directly from the teat cups, and has for its object to provide an improved milking machine and apparatus of this kind.

It has before been proposed to suspend the pulsator from the teat cups by supple connecting members. It has also been proposed to arrange the milk conduit leading from the teat cups separate from the pulsator in a construction in which the pulsator is carried from the teat cups by rigid connecting members.

According to this invention the pulsator is connected to and suspended from the teat cups only by means of supple connecting members serving as the operating connections while the teat cups are connected with the milk receptacle independently of the pulsator.

The exhaust air conduit of the suspended pulsator is advantageously connected to the vacuum system independently of the milk receptacle, which has no connection with the pulsator, and the milk receptacle is provided with a valve or valves in such manner that the milk contained therein may be isolated immediately after the milking operation until the removal of the receptacle to a suitable place for the readmission of air, the combination of these features permitting the isolation of the milk during the milking operation up to the moment of delivery.

Figure 1:
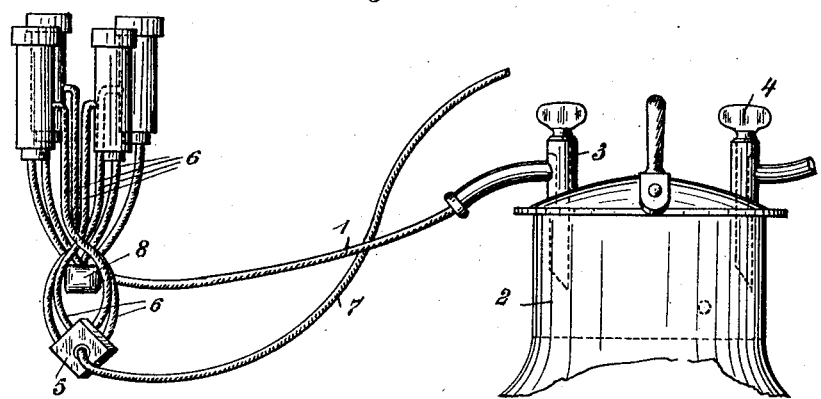

A machine provided according to the present invention is illustrated in the accompanying drawings, wherein:

Fig. 1 shows a fragmentary perspective view of my improved apparatus, and

Figure 2:
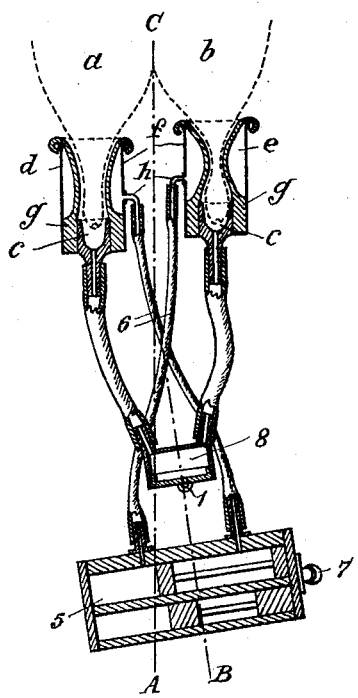

Fig. 2 a vertical sectional view of the teat cups and associated parts in operation.

The milk drawn mechanically from the cow's udder flows into the pipes 1 to be collected in the receptacle 2 without coming in contact with the surrounding atmosphere.

The receptacle 2 is provided with cocks 3 and 4, as shown in Fig. 1, which, when shut, make it possible to cut off from the air the interior of the receptacle.

When the operation of milking is completed, it is possible without contaminating the milk collected, to admit air into the remainder of the apparatus in order to remove it easily. When the milking operation is completed, the receptacles are carried into an aseptic room and there the cocks are opened for the admission of pure air.

I suspend one adjustable pulsator 5 to the four tubes 6. When in operation said pulsator acts not only by its weight, but owing to its being suspended it swings simultaneously with the suction, as will be more fully described hereinafter. The combinations of movements, i. e. suction and swinging, produces a massage of the udder which is in addition to the massage produced by the action produced by the pulsator upon each tube and cup.

Owing to this combination I am able to milk both diagonally and laterally—an important feature in certain countries where only one of the two methods is used.

The device combined with the milking receptacle hereinbefore described, likewise protects the milk from the air which comes from the pulsator when in action.

In view of the provision of the aseptic receptacle it becomes essential that the air from the pulsator should not enter the bucket or jug. For this reason my invention also consists in an arrangement which enables the air from the pulsator to exhaust beyond the pipes or receptacles which contain the milk. To this end the pulsator is connected by means of a pipe 7 with the main vacuum pipes of the stables.

The four tubes drawing the milk from the udders join on a crown 8 which is connected with the receptacle 2 which in turn is connected with the main piping.

As the milking teats work in pairs, I obtain the diagonal, lateral or transverse method of milking according to the manner in which the suction pipe and the pipe admitting the air into the chambers of the cups are connected.

The piping for the milk being independent of the piping of the vacuum of the pulsator, the apparatus and the receptacle itself maintain a constant vacuum during the whole milking operation.

It is consequently possible to use the different methods of milking during the process of milking without disturbing the vacuum in the milk pipes.

Every mechanical movement and its effects are cut off from the milk drawing pipes and from the piping through which the vacuum is produced in the receptacle.

The teat cups are formed of metal tubes $f$, within each of which is fitted a flexible rubber sleeve $g$. Fitted into the lower end of each rubber sleeve is a metal extension $c$, forming an air-tight joint between the outer metal tube $f$ and the inner rubber sleeve $g$. The metal extensions $c$ are connected by short flexible tubes to the milk collector or crown 8. To the sides of the outer metal tubes $f$ are secured short tubular extensions $h$, serving to receive flexible rubber tubes 6, the lower ends of which are connected to the pulsator 5 which is actuated through the freely suspended flexible tube 7.

In operation the teat cups will receive certain vertical movements which result directly from the known operation of said teat cups. In the interior of the rubber sleeves $g$ and the metal extensions $c$, there is constantly a certain vacuum, owing to which the teats $a$, $b$ are securely held within the rubber sleeves $g$. Within the intermediate spaces between the sleeves $g$ and tubes $f$, that is the spaces $d$, $e$, atmospheric pressure and vacuum will be produced alternately by the operation of the pulsator 5, with the result that under the action of atmospheric pressure the thin walls of the sleeves $g$ together with the teats will be compressed, the entire teat cup being at the same time moved vertically towards the udder. According to this invention said vertical movement of the teat cups which are supplied alternately and in pairs with vacuum and atmospheric pressure (two teat cups being simultaneously supplied with atmospheric pressure, whilst in the others vacuum is produced) are utilized to produce the massage of the udder, which new effect is still enhanced by the particular operation of the pulsator 5. Said pulsator may be constructed in any well known way and comprises two cylinders, communicating with each other and with the tubes 6 and within which are arranged horizontally reciprocating pistons, adapted to be alternately thrown or pushed with great power towards the left and towards the right. The shocks of said pistons or plungers are timed to coincide with the movements of the teat cups above mentioned and cause the pulsator to swing in a vertical plane, the pulsator finally causing the whole device to swing and produce a massage of the udder, this swinging movement being indicated in its first stage by the lines C—A and C—B in Fig. 2.

Having thus fully described my invention, what I claim and desire to secure by Letters Patent is:—

In a milking machine the combination with a plurality of double walled teat cups, a milk collector, flexible tubes connecting said teat cups to said milk collector and a flexible tube connecting said milk collector to a suitable milk receptacle, of a single pulsator for said teat cups, flexible connections between said teat cups and said common pulsator, whereby said pulsator is adapted to swing freely and in a regular way in operation to produce a massage of the udder and assist the milking process, and a flexible pipe extending from said pulsator to a suitable vacuum system, substantially as set forth.

In testimony whereof I have hereunto signed my name to this specification in the presence of two subscribing witnesses.

JOSEPH WILMOTTE.

Witnesses:
CHARLES A. JOHNSON,
EMILE VANSIONSIELE.